March 29, 1927.
W. F. HOLLINGSWORTH
CABLE BRAKE
Filed June 21, 1926
1,622,785
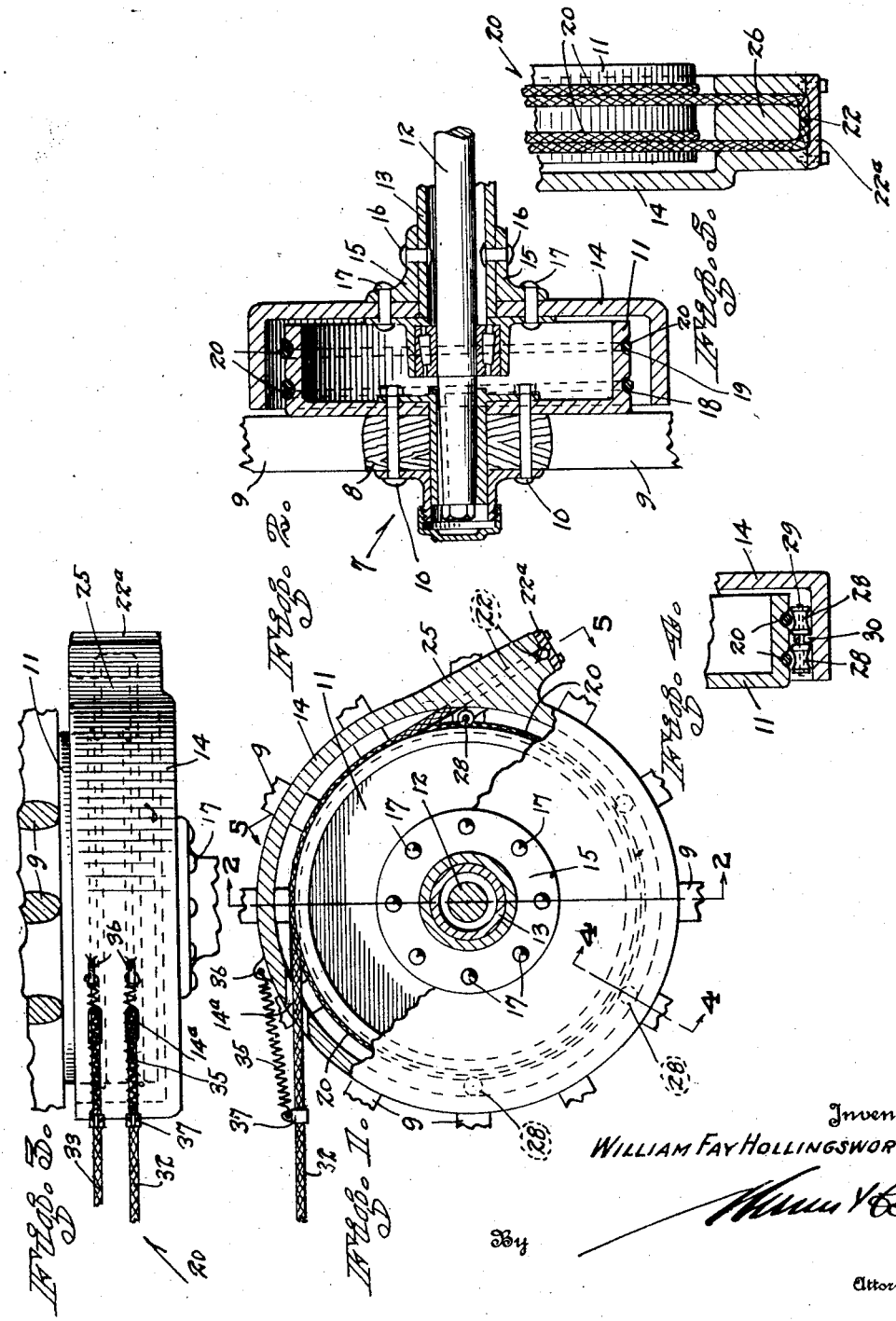
Inventor
WILLIAM FAY HOLLINGSWORTH
By
Attorneys.

Patented Mar. 29, 1927.

1,622,785

UNITED STATES PATENT OFFICE.

WILLIAM FAY HOLLINGSWORTH, OF SAN FRANCISCO, CALIFORNIA, ASSIGNOR OF ONE-HALF TO JOHN HENRY BLAIR, OF SAN FRANCISCO, CALIFORNIA.

CABLE BRAKE.

Application filed June 21, 1926. Serial No. 117,448.

This invention relates to brakes and is particularly adapted as a brake for automotive vehicles.

An object of my invention is the provision of an efficient cable brake.

With the foregoing object in view, together with such other objects and advantages as may subsequently appear, this invention resides in the construction and arrangement of parts hereinafter described and claimed, and illustrated in the accompanying drawings, in which:

Figure 1 is an elevational view, partly broken away, of my cable brake in combination with a rear wheel fragmentarily shown.

Figure 2 is a section taken on line 2—2 of Figure 1.

Figure 3 is a plan view of Figure 1.

Figure 4 is a section taken on line 4—4 of Figure 1.

Figure 5 is a section taken on the line 5—5 of Figure 1.

Referring to the drawings for more detailed description thereof, the numeral 7 indicates a rear wheel of an automobile having a hub 8 and spokes 9 to which is secured, by means of bolts 10, a circular drum 11. The wheel carries one end of a rear axle 12 which is provided with an axle housing 13, which is secured to a drum housing 14. The rear axle housing 13 is fastened to the drum housing 14 by means of a connecting member 15 secured to the axle housing by means of bolts 16, and to the drum housing by means of bolts 17. The drum 11 is provided with two peripheral grooves 18 and 19. A cable 20 is wrapped around the drum 11, there being preferably more than one turn of the cable in each of the grooves 18 and 19. A loop 22 is provided in the winding of the cable, this being shown in Figures 1 and 5, and being disposed in a projection 25 of the drum housing 14, as shown in Figure 1, the loop being held within the projection by means of the material 26 lying between the grooves which are formed in the projection to receive the cable, as shown in Figure 5. A removable plate 22ª is affixed to the end of the projection 25 in order to facilitate the replacement of the cable.

Guide rollers 28, shown in Figure 1 and in detail in Figure 4, are provided at intervals around the drum, the rollers being disposed in pairs as shown in Figure 4, the rollers of each pair being respectively opposite a groove in the drum. The rollers are mounted on shafts 29 which are carried by projections 30, inwardly extending from the drum housing 14.

The ends of the cable are indicated by the numerals 32 and 33 and are shown in Figure 3. The ends of the cable are brought out through the drum housing 14 through apertures 14ª in the housing and are adjacent each other. A retractive spring 35 is provided to draw back the ends of the cable towards the drum after a braking action has been effected, these springs being secured to the drum housing at 36 and to the cable ends at 37.

It will be readily seen that in the operation of the device a tension placed on the cable at one or both of its ends will be effective to tightly grip the drum and effect a braking action on the wheel.

While I have described one embodiment of my invention, modifications thereof may be readily devised without departing from the spirit of my invention, and it is to be understood that such modifications come within the scope of the appended claims.

I claim:—

1. A cable brake comprising a brake drum and a cable wrapped more than once around said drum and a retractive spring for each end of the cable tending to pull it towards said drum.

2. A cable brake comprising a brake drum and a cable wrapped more than once around said drum and a housing for said drum, said drum having a plurality of grooves and said cable lying in said grooves, said cable being looped and the looped portion being fastened, and a retractive spring for each end of the cable tending to pull it towards said drum.

3. A cable brake comprising a brake drum and a cable wrapped more than once around said drum and a housing for said drum, and roller guides for said cable mounted on said housing.

4. A cable brake comprising a brake drum and a cable wrapped more than once around said drum and a housing for said drum, said drum having a plurality of grooves and said cable lying in said grooves, said cable looped and the looped portion being fastened, and roller guides for said cable.

WILLIAM FAY HOLLINGSWORTH.